United States Patent [19]

Kuo

[11] Patent Number: 4,843,336

[45] Date of Patent: Jun. 27, 1989

[54] DETACHABLE MULTI-PURPOSE SELF-DEFENDING DEVICE

[76] Inventor: Shen-Shaon Kuo, 2FL., No. 157, Sec. 2, Hsin Hai Rd., Taipei, Taiwan

[21] Appl. No.: 131,661

[22] Filed: Dec. 11, 1987

[51] Int. Cl.[4] .......................... G08B 19/00; H01G 3/00; F41F 27/00

[52] U.S. Cl. .......................................... 340/521; 340/573; 340/321; 340/693; 42/1.01; 42/1.08; 273/84 ES; 361/232; 361/235; 362/110; 362/111; 446/405; 446/473

[58] Field of Search ............... 340/521, 573, 321, 692, 340/693, 384 E, 384 R; 362/109–114; 446/405, 406, 473; 361/232, 235; 42/1.01, 7, 1.08, 54, 106; 273/84 ES

[56] References Cited

U.S. PATENT DOCUMENTS

| | | | |
|---|---|---|---|
| 4,162,515 | 7/1979 | Henderson et al. | 361/232 |
| 4,348,716 | 9/1982 | Storm et al. | 362/110 |
| 4,486,807 | 12/1984 | Yanez | 361/232 |
| 4,691,264 | 9/1987 | Schaffhauser et al. | 361/232 |

*Primary Examiner*—Donnie L. Crosland
*Attorney, Agent, or Firm*—Morton J. Rosenberg

[57] ABSTRACT

A detachable multi-purpose self-defending device and in particular to one mainly composed of a grip and a barrel, the grip being provided with a high voltage oscillating circuit for supplying a high voltage to the electrodes mounted at the front end of the barrel so as to be able to make the wicked faint temporarily, a pizo siren for sending out warning signal to arouse the other's attention to arrest the wicked, a flashlight for giving light in the dark, and a strobe light for emitting rapid, brief and brilliant flashes of light to cause the weaked to lose consciousness momentarily. Moreover, the grip may be connected to a leaf-spring switch which is inserted between the door and the frame so that when the door is opened, the spring leaves thereof will separate from each other hence actuating the pizo siren. In addition, the grip may be connected with a sensor which is designed so that in case the fume conncentration and the temperature exceed the rated value, the pizo siren will be actuated to send out a warning signal.

2 Claims, 7 Drawing Sheets

DETACHABLE MULTI-PURPOSE SELF-DEFENDING DEVICE

BACKGROUND OF THE INVENTION

This invention relates to a detachable multi-purpose self-defending device mainly composed of a grip and a barrel, the former being provided with a pizo siren, a flashlight and a strobe light and capable of connecting a leaf-spring switch and a sensor while the latter with a high voltage oscillating circuit and a pair of electrodes thereby accomplishing the purposes of self-defending, burglar-preventing, disaster-warning, sending signal for help as well as illuminating.

Furthermore, the grip can be detected from the barrel as desired hence enabling it to be carried about conveniently, to be produced separately so as to reduce the cost risk thereof and to be adapted to the laws of all countries but still having the functions of calling help, burglar-preventing, disaster-warning and illuminating.

It is found that the prior art self-defending device has only one function and either utilizes high voltage electricity to defend against the wicked or a loud voice to arouse other's attention to scare the wicked. Whereas, the device has but a single function and cannot be used otherwise. Moreover, the high-voltage self-defending device is prohibited to be carried into certain countries and so the user has to buy another one of the other type. Obviously, it is unfit for practical use.

It is, therefore, and object of the present invention to provide a detachable multi-purpose self-defending device which may obviate and mitigate the above-mentioned drawbacks.

SUMMARY OF THE INVENTION

This invention relates to a detachable multi-purpose self-defending device.

The primary object of the present invention is to provide a detachable multi-purpose self-defending device mainly composed of a grip and a barrel, the former being detachable from the latter so as to be used alone thereby enabling it to be carried about conveniently, to be adapted to the laws of all countries and to be produced separately so as to lower the cost risk thereof.

Another object of the present invention is to provide a detachable multi-purpose self-defending device which utilizes high voltage electricity to defend against the wicked so as to make him faint temporarily and lose attacking ability.

Still another object of the present invention is to provide a detachable multi-purpose self-defending device comprising a pizo siren which may send out audio warning signal to scare the wicked and to arouse other's attention so as to arrest the wicked.

Still another object of the present invention is to provide a detachable multi-purpose self-defending device which is provided with an illuminating means.

Still another object of the present invention is to provide a detachable multi-purpose self-defending device having a strobe light which may emit rapid, brief and brilliant flashes of light to make the wicked lose conscience momentarily and to send out a signal for help.

Still another object of the present invention is to provide a detachable multi-prupose self-defending device which can be connected to a leaf-spring switch inserted between the door and the frame so that when the door is opened, the spring leaves thereof will separate from each other hence actuating the pizo siren and therefore, achieving the prupose of burglar prevention.

A further object of the present invention is to provide a detachable multi-purpose self-defending device which can be further connected with a sensor whereby the pizo siren will be actuated at the time when the fume concentration and the temperature exceed the rated value.

Other objects and merits and a fuller understanding of the present invention will be obtained by those having ordinary skill in the art when the following detailed description of the referred embodiment has been read in conjunction with the accompanying drawings wherein like numerals refer to like or similar parts and in which:

DETAILED DESCRIPTION OF THE PREFERRED EMBODIMENT

Figure 1:
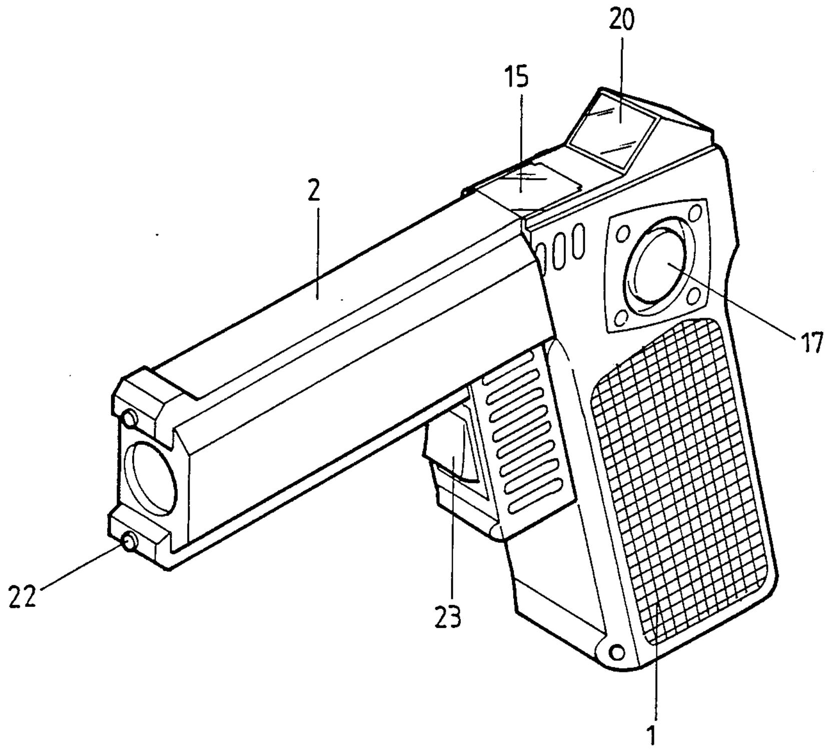
FIG. 1 is a perspective view of a detachable multi-purpose self-defending device according to a preferred embodiment of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
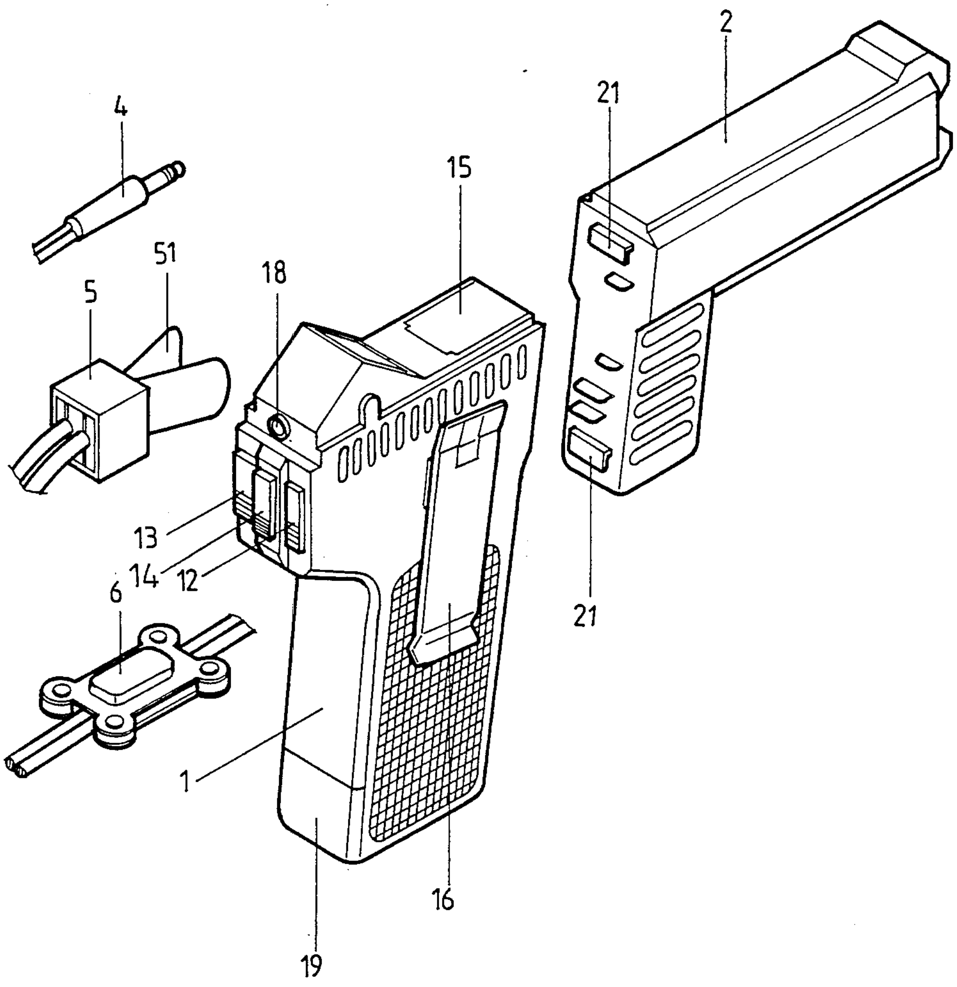
FIG. 2 is an exploded view of the present invention.
Figure 3:
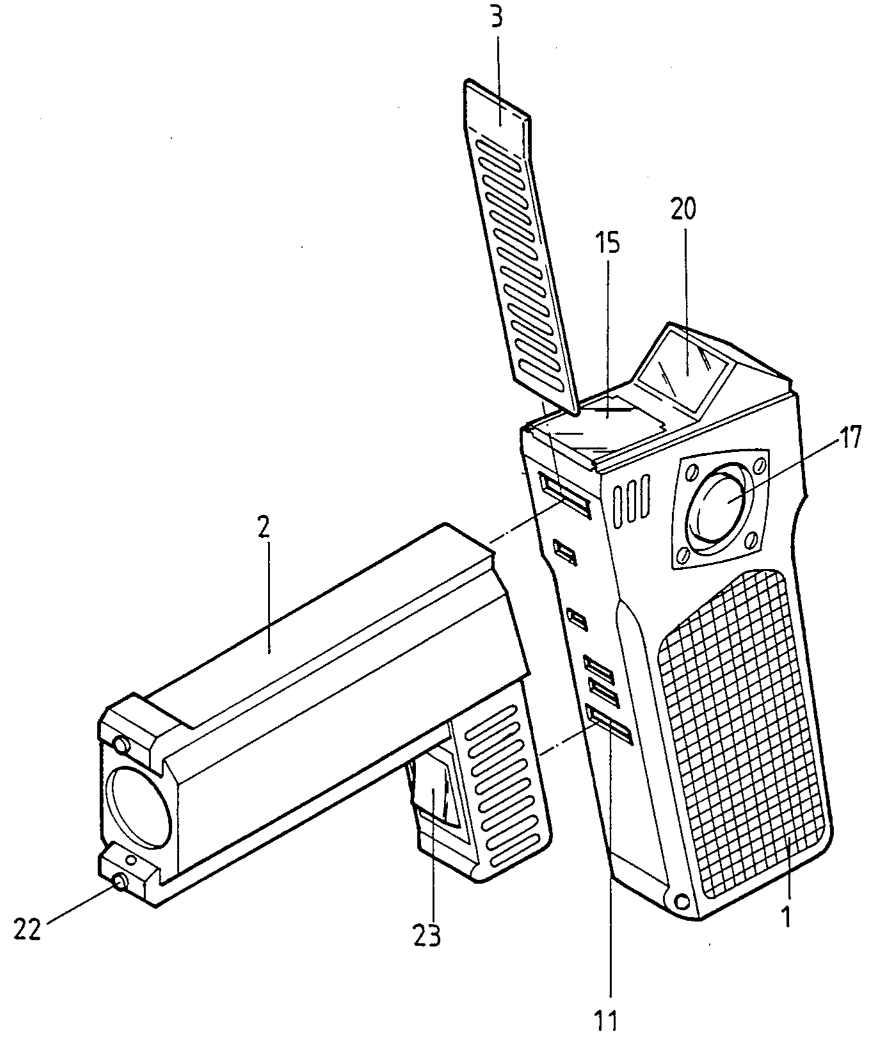
FIG. 3 is an exploded view of the present invention from another direction.
Figure 4:
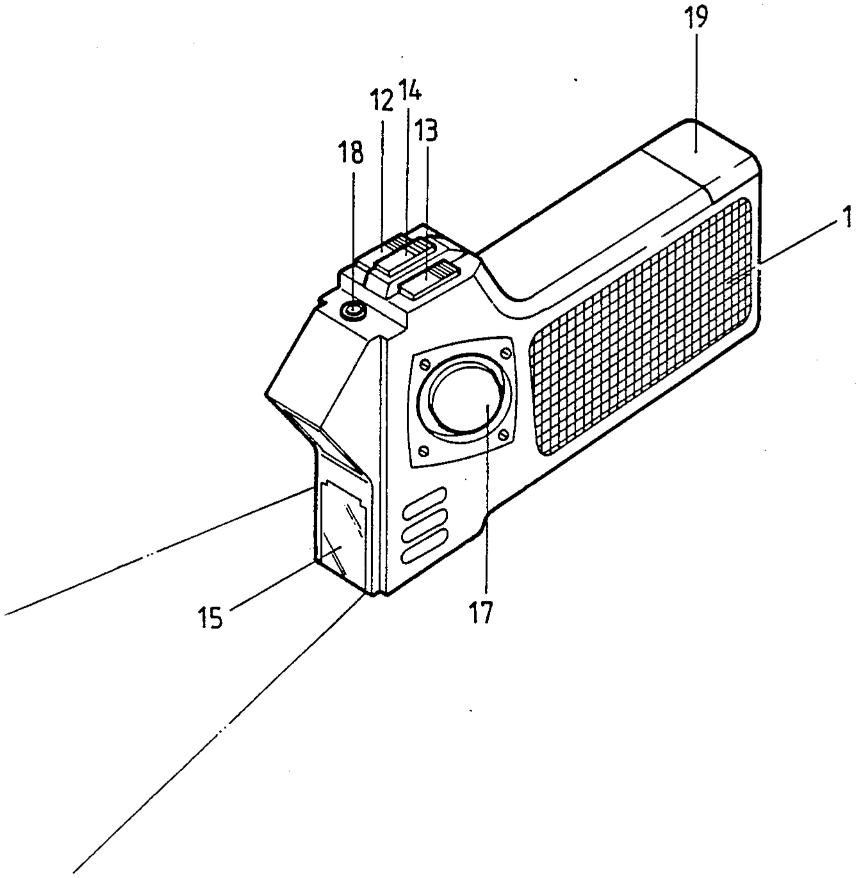
FIG. 4 is a perspective view of the grip according to the present invention.

With reference to the drawings and in particular to FIGS. 1, 2 and 3, the detachable multi-purpose self-defending device according to the present invention mainly comprises a grip 1 and a barrel 2. The inner side of the grip 1 is formed with an upper slot and a lower slot 11 while the barrel 2 is provided at the inner side thereof with corresponding protruding members 21 adapted to be connected with the slots 11 so that the barrel 2 can be easily engaged with and detached from the grip 1.

Figure 6:
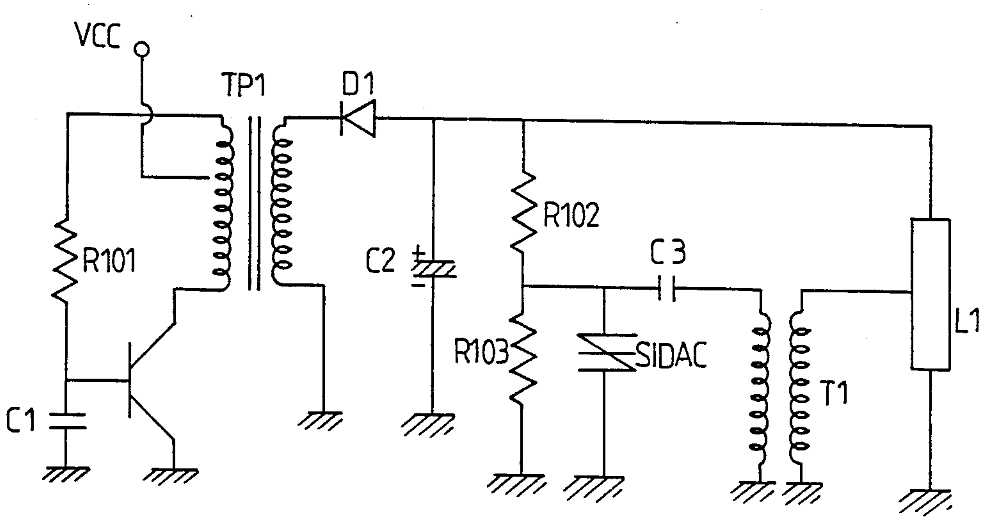
FIG. 6 is a circuit for the storbe light of the present invention.
Figure 7:
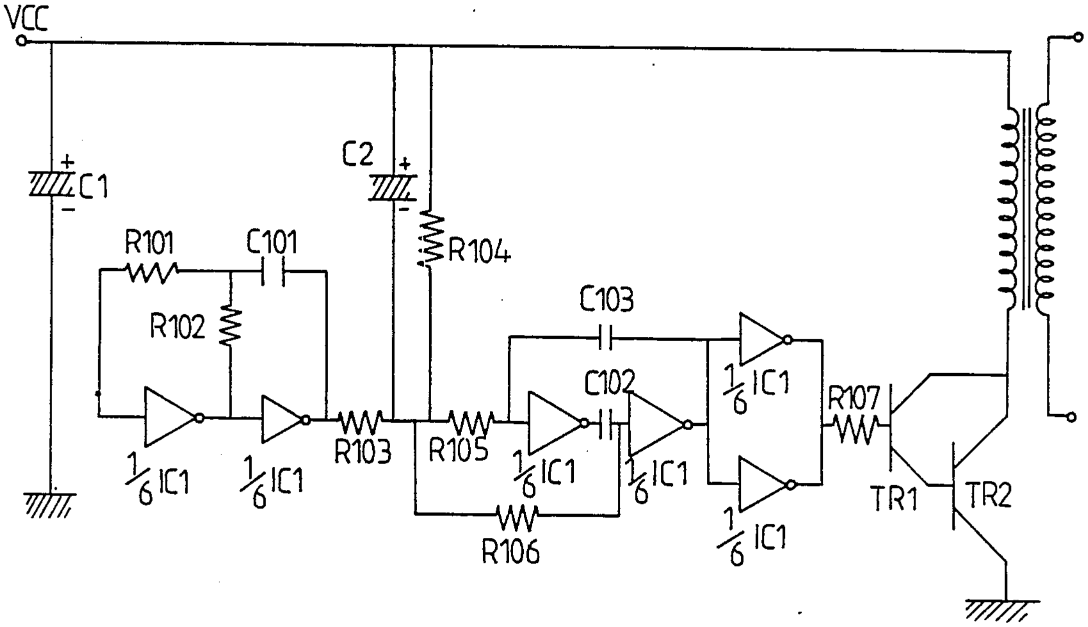
FIG. 7 is a circuit for the pizo siren of present invention.

On the upper outer side of the grip 1 there are a light switch 12 for controlling an illuminating circuit (not shown), a pizo siren switch 13 for controlling an audio pizo oscillating circuit (see FIG. 7), a strobe light circuit (FIG. 6), and a socket 18 connected with the audio pizo oscillating circuit. The above-mentioned illuminating circuit, strobe light circuit and the audio pizo oscillating circuit are well known in the art and there is no need to describe hear in detail. Mounted on the top of the grip 1 is an illuminating means 15 so as to be able to act as an electric flashlight in the dark. The grip 1 is further provided at one side with a pizo siren 18 for sending out a very loud sound to scare the wicked and also to arouse the other's attention to arrest him, and a detachable hook member 16 for enabling the self-defending device to be hung on the clothes. Moreover, the grip 1 has at the lower part thereof a room 20 for receiving the battery for the circuits.

The grip 1 may be connected to a leaf-spring switch 5 which is inserted between the door and the frame so that when the door is opened, the spring leaves 51 thereof will separate from each other hence actuating the pizo siren and therefore, achieving the purpose of burglar prevention. The grip 1 may be further connected with a sensor 6 whereby the pizo siren 17 will be actuated at the time when the fume concentration and the temperature exceed the rated value.

Figure 5:
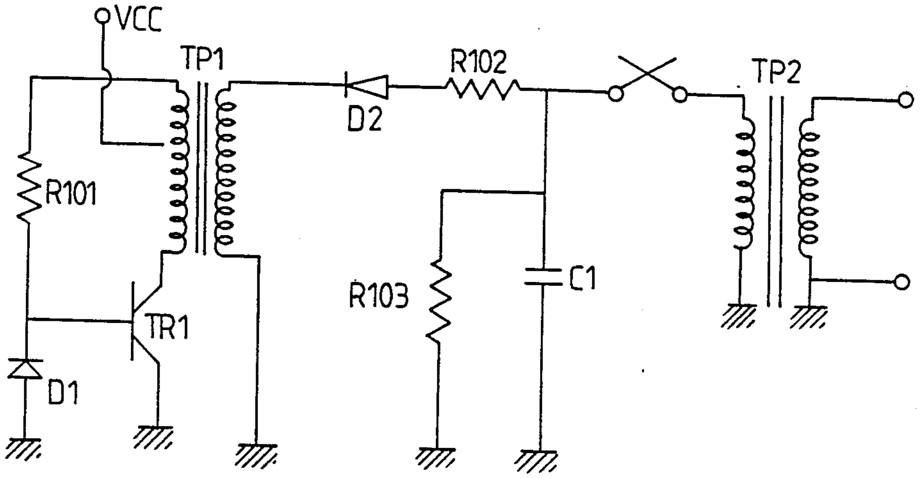
FIG. 5 is a high voltage oscillating circuit of the present invention.

The front end of the barrel 2 is provided with two electrodes 22 constituting a pair of discharging components. On the lower part of the barrel 2 there is a trigger 23 for controlling a high voltage oscillating circuit (see FIG. 5). The high voltage oscillating circuit is connected with the electrodes 22 so that when the trigger 23 is pressed, there will be a high voltage applied to the electrodes 22. However, it should be noted that the current is very small and so the wicked will only be fainted temporarily when he gets in touch with the electrodes 22, but will not be seriously hurted thereby complying with the law. As the above-mentioned circuits, the high voltage oscillating circuit is also well known in the art and there is no need to be described here in detail.

Conclusively, the present invention is indeed a detachable multi-purpose self-defending device wherein the grip may be detached from the barrel thereby enabling it to be carried about conveniently, to be adapted to the laws of all countries, and to be produced separately so as to reduce the cost risk thereof.

Although this invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:

1. A detachable multi-purpose self-defending device comprising:

a grip provided with a plurality of slots formed within an inner surface thereof, a light switch for controlling a flashlight mounted on a top surface thereof, a strobe light switch for controlling a strobe light located beside the flashlight, and a pizo siren switch for controlling a pizo siren located on one side of said grip, a detachable hook member located on an opposing side of said grip for releasably mounting said self-defending device to a user's clothing ; and a barrel having a front end, two electrodes mounted on said front end of said barrel defining a pair of electrical discharging components, a switch connecting said electrodes with a high voltage oscillating circuit disposed in the barrel for passing a high voltage electrical charge to said electrodes and a plurality of protruding members adapted to engage with corresponding slots of the grip for releasably coupling said barrel to said grip, said grip including a room for receiving a battery electrically coupled to said high voltage oscillating circuit.

2. A detachable multi-purpose self-defending device as claimed in claim 1, wherein said grip is further provided with a socket connecting said pizo siren to a leaf-spring switch and a sensor, said leaf spring switch coupled to said pizo siren including a pair of leaf springs which may be inserted between a door and a frame member in contiguous contact each with respect to the other, when said door is opened, said leaf springs being separated for actuating said pizo siren to emit a warning signal.

* * * * *